(12) United States Patent
Giovenga

(10) Patent No.: US 9,919,796 B2
(45) Date of Patent: Mar. 20, 2018

(54) CONVERTIPLANE WITH NEW AERODYNAMIC AND TECHNICAL SOLUTIONS WHICH MAKE THE AIRCRAFT SAFE AND USABLE

(71) Applicant: UNIT 1SRL, Rome (IT)

(72) Inventor: Pietro Giovenga, Rome (IT)

(73) Assignee: UNIT 1 SRL, Rome (IT)

( * ) Notice: Subject to any disclaimer, the term of this patent is extended or adjusted under 35 U.S.C. 154(b) by 56 days.

(21) Appl. No.: 14/908,850

(22) PCT Filed: Aug. 7, 2014

(86) PCT No.: PCT/IT2014/000212
§ 371 (c)(1),
(2) Date: Jan. 29, 2016

(87) PCT Pub. No.: WO2015/022711
PCT Pub. Date: Feb. 19, 2015

(65) Prior Publication Data
US 2016/0167780 A1 Jun. 16, 2016

(30) Foreign Application Priority Data

Aug. 12, 2013 (IT) .............................. RM2013A0473

(51) Int. Cl.
*B64C 27/22* (2006.01)
*B64C 29/00* (2006.01)
(Continued)

(52) U.S. Cl.
CPC .......... *B64C 29/0033* (2013.01); *B64C 3/385* (2013.01); *B64C 3/54* (2013.01);
(Continued)

(58) Field of Classification Search
CPC ........ B64C 2201/021; B64C 2201/104; B64C 2201/108; B64C 2201/162;
(Continued)

(56) References Cited

U.S. PATENT DOCUMENTS 1,710,225 A * 4/1929 Kennedy ................. B64C 25/42
244/110 H
2,595,504 A * 5/1952 Avery ................... B64C 11/001
239/265.11
(Continued)

FOREIGN PATENT DOCUMENTS

DE 19639823 A1 4/1998
DE 29916203 U1 10/2000

OTHER PUBLICATIONS

International Search Report for corresponding International Application No. PCT/IT2014/000212.

*Primary Examiner* — Medhat Badawi
(74) *Attorney, Agent, or Firm* — Egbert Law Offices, PLLC

(57) ABSTRACT

A convertiplane has the ability to take off like a helicopter and then fly horizontally like a conventional aircraft. The aircraft includes a variable incidence front wing of variable span located below the fuselage and mounted on a structure in the form of a venturi tube, a rear wing having two propellers for controlling the stability of the vehicle in pitch and roll installed therein, two counter-rotating, pivotally mounted ducted propellers equipped with four flaps orthogonal to each other provided on the sides of the cockpit, engines placed behind the cockpit close to the center of gravity, a static balancing system for controlling the center of gravity of the aircraft consisting of a weight placed in the lower part of the fuselage, self-propelled on the track rack longitudinally to the fuselage, and a digital flight control system.

8 Claims, 12 Drawing Sheets

Figure 1:
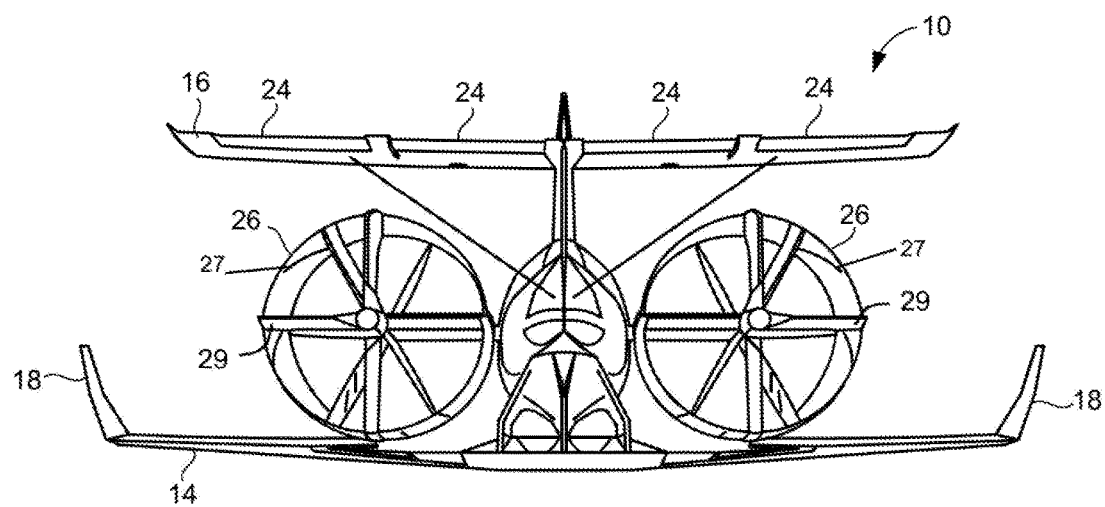
Figure 2:
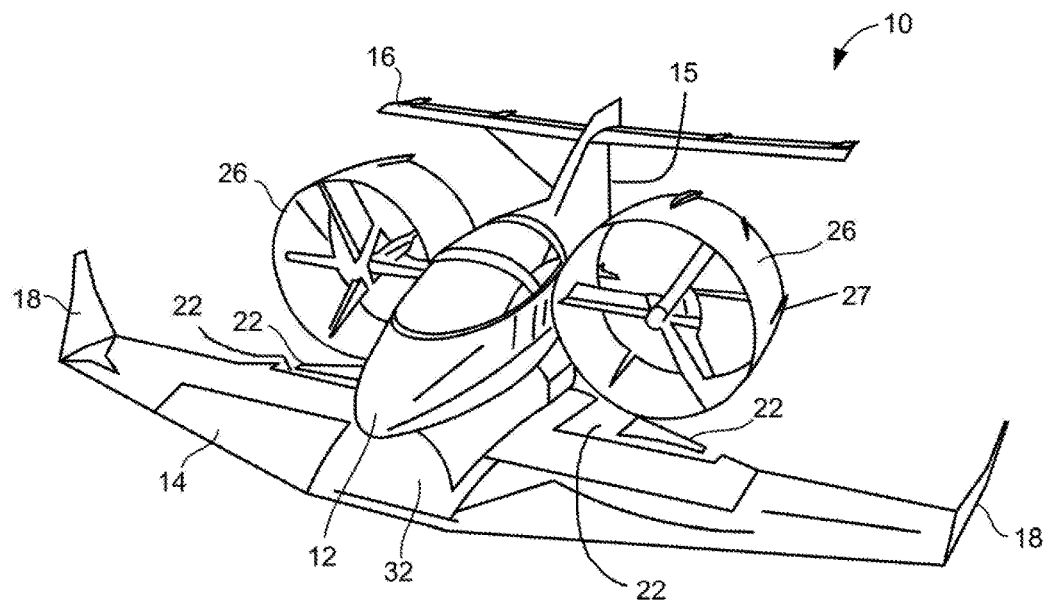
Figure 3:
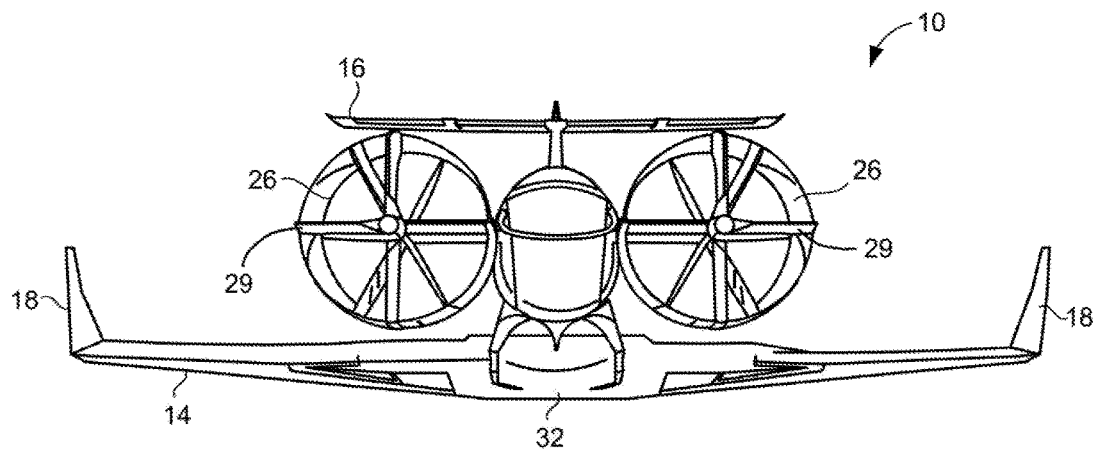
Figure 4:
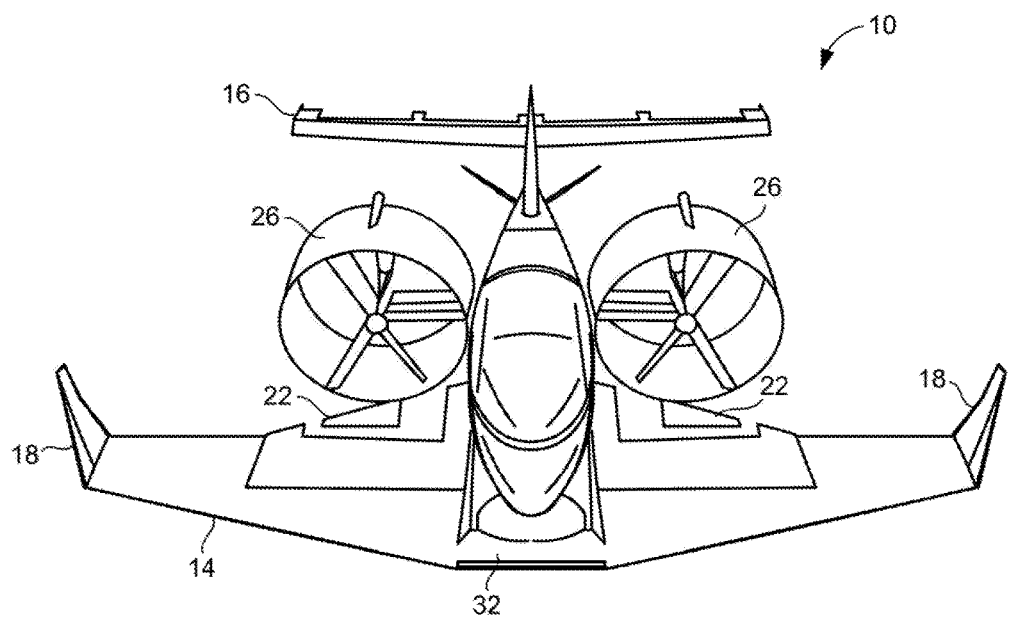
Figure 5:
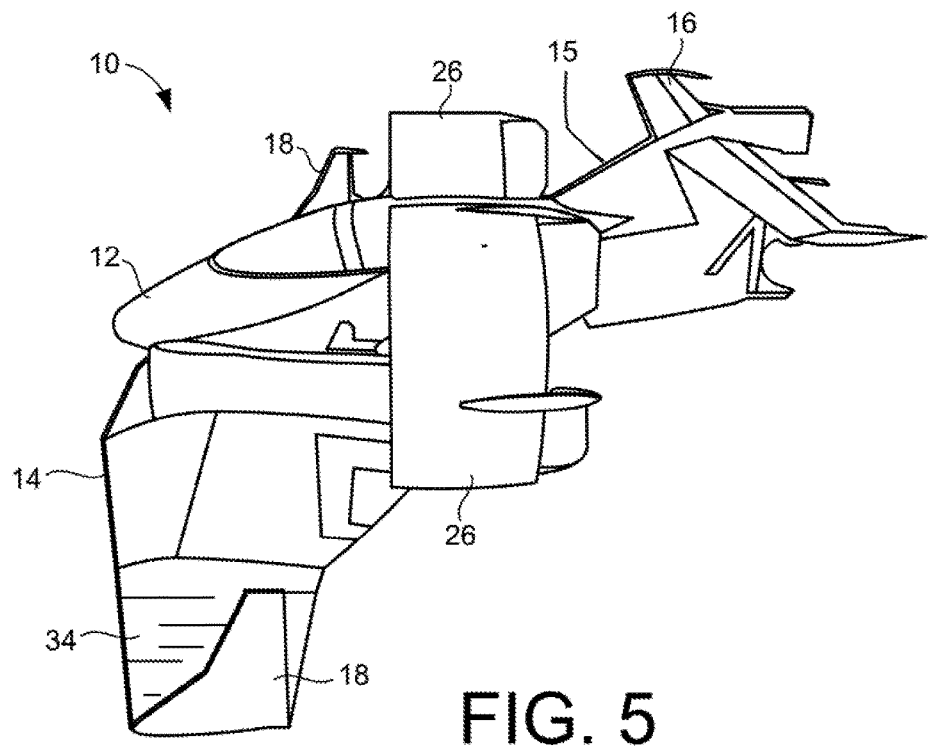
Figure 6:
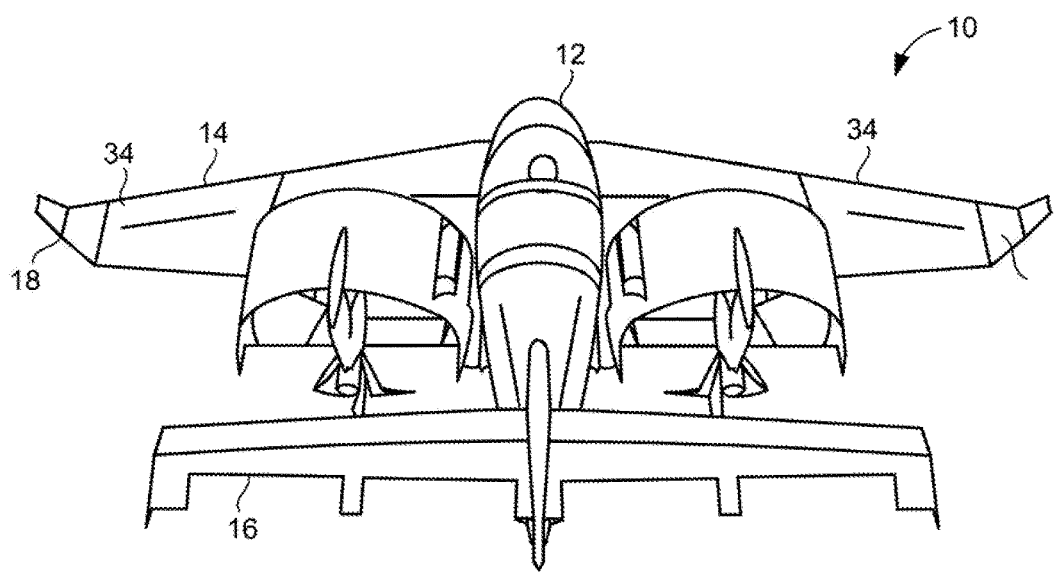

(51) Int. Cl.
*B64C 3/38* (2006.01)
*B64C 3/54* (2006.01)
*B64D 27/08* (2006.01)
*B64C 39/02* (2006.01)

(52) U.S. Cl.
CPC ............ *B64C 39/024* (2013.01); *B64D 27/08* (2013.01); *B64C 2201/021* (2013.01); *B64C 2201/104* (2013.01); *B64C 2201/108* (2013.01); *B64C 2201/162* (2013.01); *Y02T 50/145* (2013.01)

(58) Field of Classification Search
CPC ... B64C 29/0033; B64C 39/024; B64C 3/385; B64C 3/54; B64C 27/26; B64C 2700/6291; B64C 29/0025; B64C 23/005; B64D 27/08; Y02T 50/145
See application file for complete search history.

(56) References Cited

U.S. PATENT DOCUMENTS

| | | | | | |
|---|---|---|---|---|---|
| 2,847,173 | A * | 8/1958 | McCarty, Jr. | ......... | B64C 39/026 244/17.11 |
| 2,940,689 | A * | 6/1960 | Howell | ............... | B64C 29/0025 244/12.3 |
| 3,115,317 | A * | 12/1963 | Merrick | ................. | B64C 23/005 244/12.4 |
| 3,167,273 | A * | 1/1965 | Alvarez | .............. | B64C 29/0033 244/12.4 |
| 3,260,476 | A * | 7/1966 | James | ................. | B64C 29/0025 244/55 |
| 3,307,807 | A * | 3/1967 | Stoppe | .................... | B64C 3/385 244/48 |
| 4,296,896 | A * | 10/1981 | Kress | ................. | B64C 29/0075 244/12.4 |
| 5,115,996 | A * | 5/1992 | Moller | ................. | B64C 29/0025 239/265.19 |
| 5,890,441 | A * | 4/1999 | Swinson | ............. | B64C 29/0025 244/12.1 |
| 6,561,456 | B1 * | 5/2003 | Devine | ............... | B64C 29/0025 244/12.1 |
| 7,874,513 | B1 * | 1/2011 | Smith | .................... | B64C 11/001 244/12.4 |
| 9,145,846 | B2 * | 9/2015 | Webster | ................ | F02K 1/1207 |
| 9,688,397 | B2 * | 6/2017 | Smith | ................. | B64C 29/0033 |
| 2001/0040062 | A1 * | 11/2001 | Illingworth | ........... | B64C 11/001 180/117 |
| 2002/0047071 | A1 * | 4/2002 | Illingworth | ........... | B64C 11/001 244/199.1 |
| 2003/0080242 | A1 * | 5/2003 | Kawai | ................... | B64C 11/001 244/12.4 |
| 2003/0136873 | A1 * | 7/2003 | Churchman | ........ | B64C 29/0025 244/10 |
| 2004/0026563 | A1 * | 2/2004 | Moller | ...................... | B64C 3/56 244/12.4 |
| 2005/0133662 | A1 * | 6/2005 | Magre | ................. | B64C 29/0033 244/7 R |
| 2006/0016930 | A1 * | 1/2006 | Pak | ........................ | A63H 27/14 244/12.4 |
| 2006/0022084 | A1 * | 2/2006 | Magre | ................. | B64C 29/0033 244/12.4 |
| 2006/0097107 | A1 * | 5/2006 | Parks | .................... | B64C 11/001 244/52 |
| 2007/0018035 | A1 * | 1/2007 | Saiz | ........................ | B64C 15/00 244/12.3 |
| 2010/0051740 | A1 * | 3/2010 | Yoeli | .................... | B64C 29/0033 244/12.1 |
| 2010/0187369 | A1 * | 7/2010 | Fleming | ................ | B64C 39/024 244/23 C |
| 2011/0001017 | A1 * | 1/2011 | Burdisso | ............... | B64C 39/024 244/23 A |
| 2011/0031355 | A1 * | 2/2011 | Alvarez | ................... | B64C 3/10 244/7 R |
| 2011/0133037 | A1 * | 6/2011 | Martin | .................. | B64C 39/026 244/4 A |
| 2011/0315806 | A1 * | 12/2011 | Piasecki | ................. | G05D 1/102 244/2 |
| 2012/0043413 | A1 * | 2/2012 | Smith | ................. | B64C 29/0033 244/12.4 |
| 2012/0091257 | A1 * | 4/2012 | Wolff | ................... | B64C 29/0033 244/12.4 |
| 2012/0234968 | A1 * | 9/2012 | Smith | .................. | B64C 29/0033 244/12.3 |
| 2013/0062455 | A1 * | 3/2013 | Lugg | ................... | B64C 29/0025 244/12.3 |
| 2014/0339372 | A1 * | 11/2014 | Dekel | ................. | B64C 29/0033 244/7 R |
| 2015/0197335 | A1 * | 7/2015 | Dekel | ................. | B64C 29/0033 701/5 |
| 2015/0314865 | A1 * | 11/2015 | Bermond | ........... | B64C 29/0033 244/17.27 |
| 2016/0009404 | A1 * | 1/2016 | Newman | ................... | F02K 3/00 701/3 |
| 2016/0040595 | A1 * | 2/2016 | Devine | ................ | F02K 3/06 415/2.1 |
| 2016/0340035 | A1 * | 11/2016 | Duru | ....................... | B64C 27/20 |

* cited by examiner

CONVERTIPLANE WITH NEW AERODYNAMIC AND TECHNICAL SOLUTIONS WHICH MAKE THE AIRCRAFT SAFE AND USABLE

The convertiplane aircraft is always conceived and designed with a basic concept it has the ability to take off like a helicopter and then fly horizontally like a normal aircraft wings supported.

The patent the company want to record, following the withdrawal of the previous application RM2012A000046 of the architect Pietro Giovenga still on the same subject, the withdrawal is motivated by the addition of some modifications regarding the use of technical solutions of the patent in the convertiplane projects of all sizes and use and because will to use in the assets control solutions even cyclic variation of the pitch of propellers in front and rear, therefore, concerns to a new type of convertiplane, also achievable like ultra light plane, called "GRIFO". It is equipped with features designed in order to allow an easier use of this aircraft, thus enabling new ways to fly. The convertiplane in question proposes the use of a wide range of functions concentrated only in one plane, as opposed to now where each of these functions is used on a specific plane. (See FIG. 1, FIG. 2, FIG. 3, FIG. 4, FIG. 5, FIG. 6, drawings in all positions).

The convertiplane "GRIFO", object of the patent, allows to obtain the maneuverability at low and very low speed of a helicopter along with the ability of flight of an aircraft, obtaining an ability to displacement at low cost. The convenience of use of the aircraft is evident. (see Table 1, 3d designs in all positions)

Figure 7:
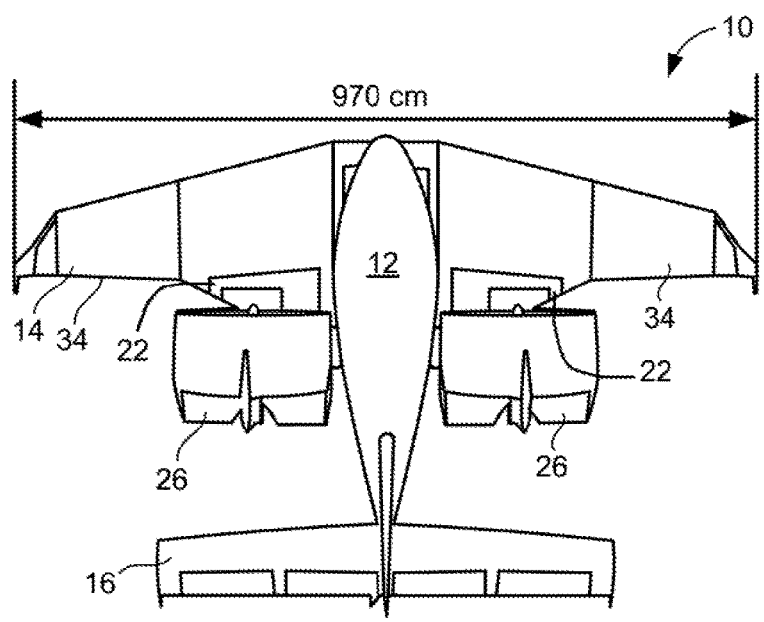
Figure 8:
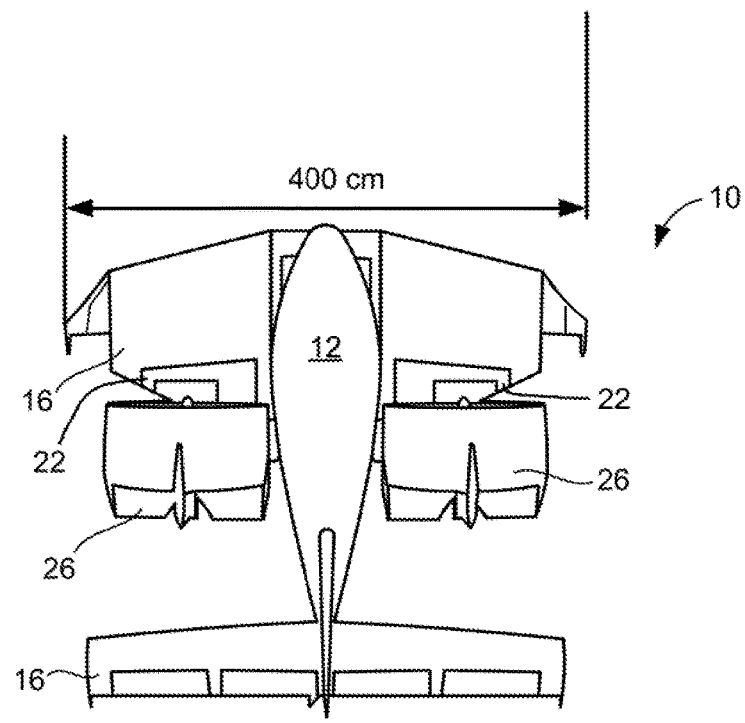
Figure 13:
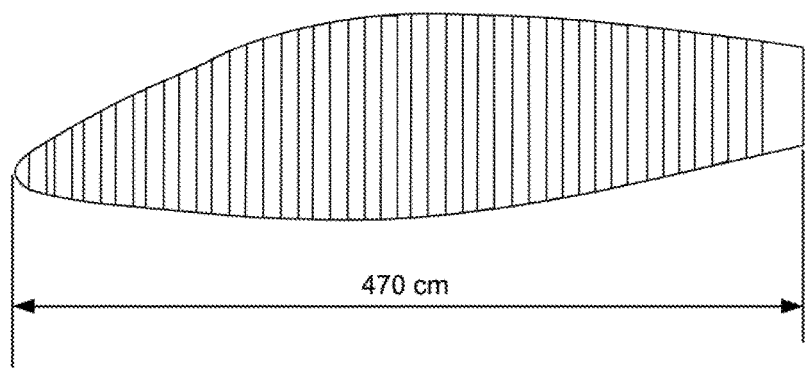
Figure 14:
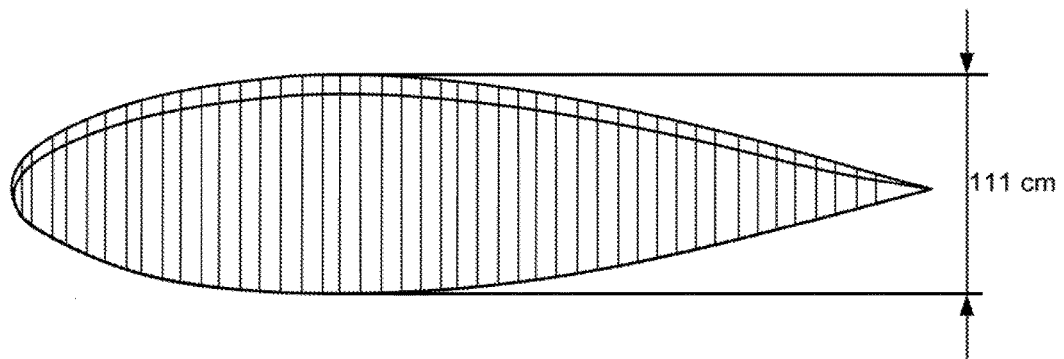
Figure 15:
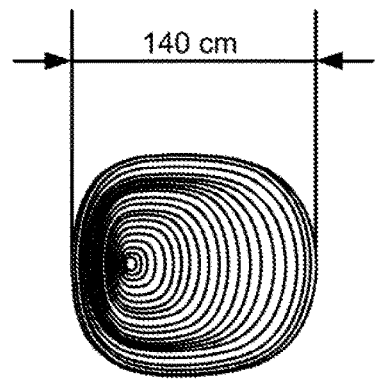

The Grifo as ultralight aircraft 10 has the following functional characteristics operational:

The fuselage 12: Internal height variable from 110 cm to 140 cm (See, FIG. 13, FIG. 14, FIG. 15), interior width variable from 90 cm to 120 cm (See, FIG. 14), Cabin length variable from 160 cm to 220 cm, the fuselage 12 length variable from 400 cm to 500 cm (See FIG. 13);

Ground clearance: Propellers shaft variable from 120 cm to 140 cm, the fuselage 12 variable from 50 cm to 80 cm, front wings 14 variable from 20 cm to 50 cm;

Wingspan: minimum size variable from 400 cm to 500 cm (See, FIG. 8), maximum size variable from 850 cm to 970 cm (See, FIG. 7);

Wing surface load-bearing, Considering front wing and tail planes surfaces: At the maximum wingspan variable from 10.50 to 15.00 sq mt, At the minimum wing area variable from 6.50 sq mt to 10.50 sq mt;

Total weight without liquids: no more than 230.00 kg; Fuel: early 80 kg; No 2 passengers: nearly 200 kg; Payload: nearly 40 kg; Total take-off weight: nearly 550 kg;

Load capacity: 2 people side by side or 1 person and a 1 stretcher.

Figure 9:
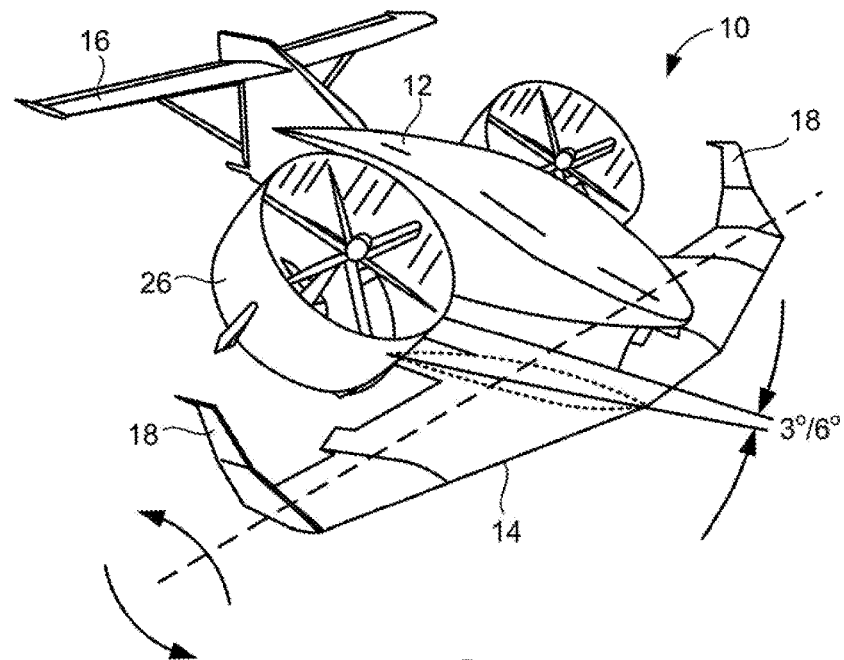
Figure 10:
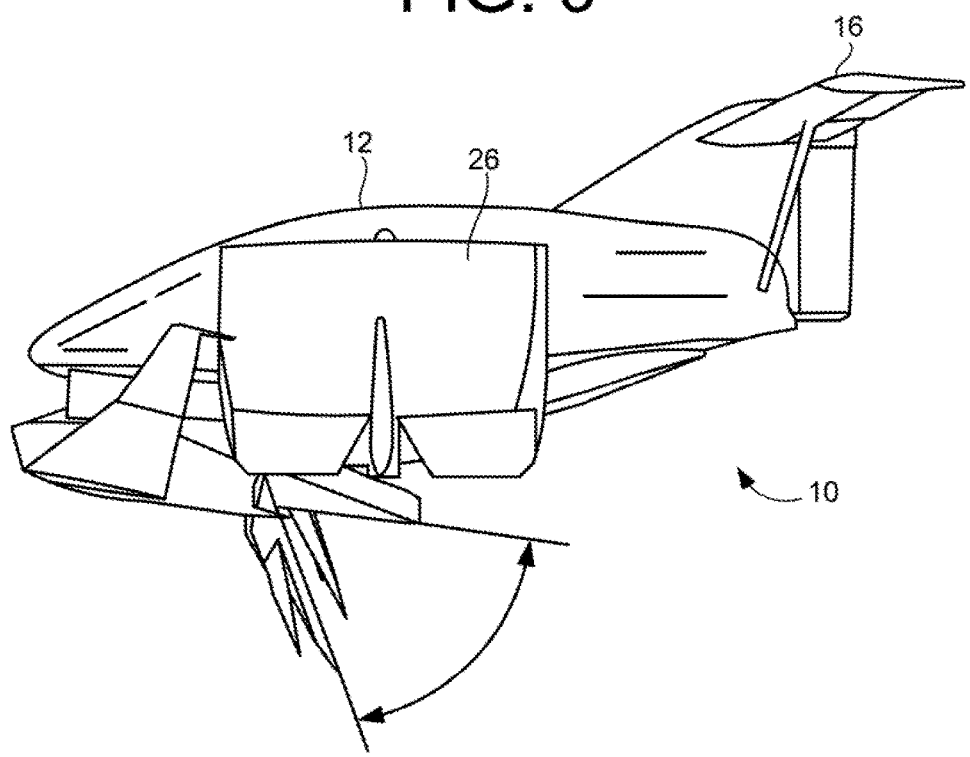
Figure 11:
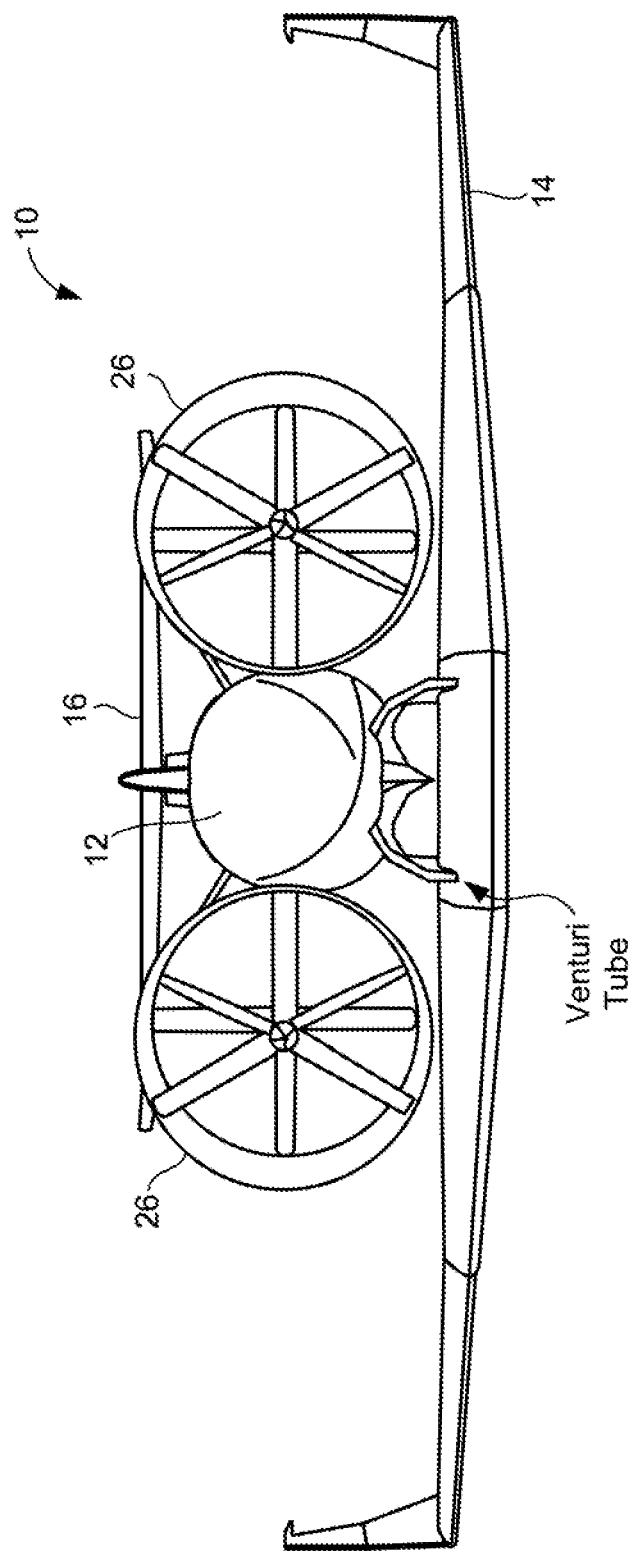

General aviation features of a convertiplane Type "Grifo"
The aircraft consists of:
Front-load bearing wing 14 length variable (see in plant view for maximum FIG. 7 and minimum FIG. 8 wing extension);
Each half wing is equipped with two flaps 22, one operated by the control system set-up and one for the government of the vehicle 10 by the pilot (See, FIG. 7, FIG. 8). The main Wing (front) 14 has the characteristics necessary to adapt to different arrangements of flight, it can rotate on its longitudinal barycentral axis a range of degrees related to the airfoil adopted (See. FIG. 9), and a part 34 of it is retractable in the part of a wing attached to the fuselage 12. This solution is adopted to reduce the size of the vehicle 10 on landing and take off vertically and also to decrease the resistance during the flight under certain operational conditions. The wing 14 has a vertical dihedral that can vary from 3° to 6° to help the stability of the vehicle 10. The efficiency and stability is improved by two vertical "wings of the end" 18 applied on the wing 14 itself. The front wing 14 is connected to the fuselage 12 by two brackets that support an axis around which the wing 14 can make a rotation of some grades in relation of each specific airfoil chosen. (See FIG. 9 showing the wing rotation).

The supports that hold the wings are part of the structure and they have in the ends the slots that hold the bearings that allow the coupling the tube axis, placed between the ribs supporting the winging in the central area, with the structure of the plane 10. The movement is actuated by two hydraulic or electric actuators operated by the on board computer that manages the set-up of the plane.

The supports are clad in a way that creates a "Venturi tube" section in which is generated the acceleration of the airflow. This increases the lift of the wing section placed under the fuselage 12, without however creating opposing forces the increase in lift on the other walls of the tube. (See Sheet of drawings no 4/9 highlight the design with 3D "Venturi tube" FIG. 8).

Figure 12:
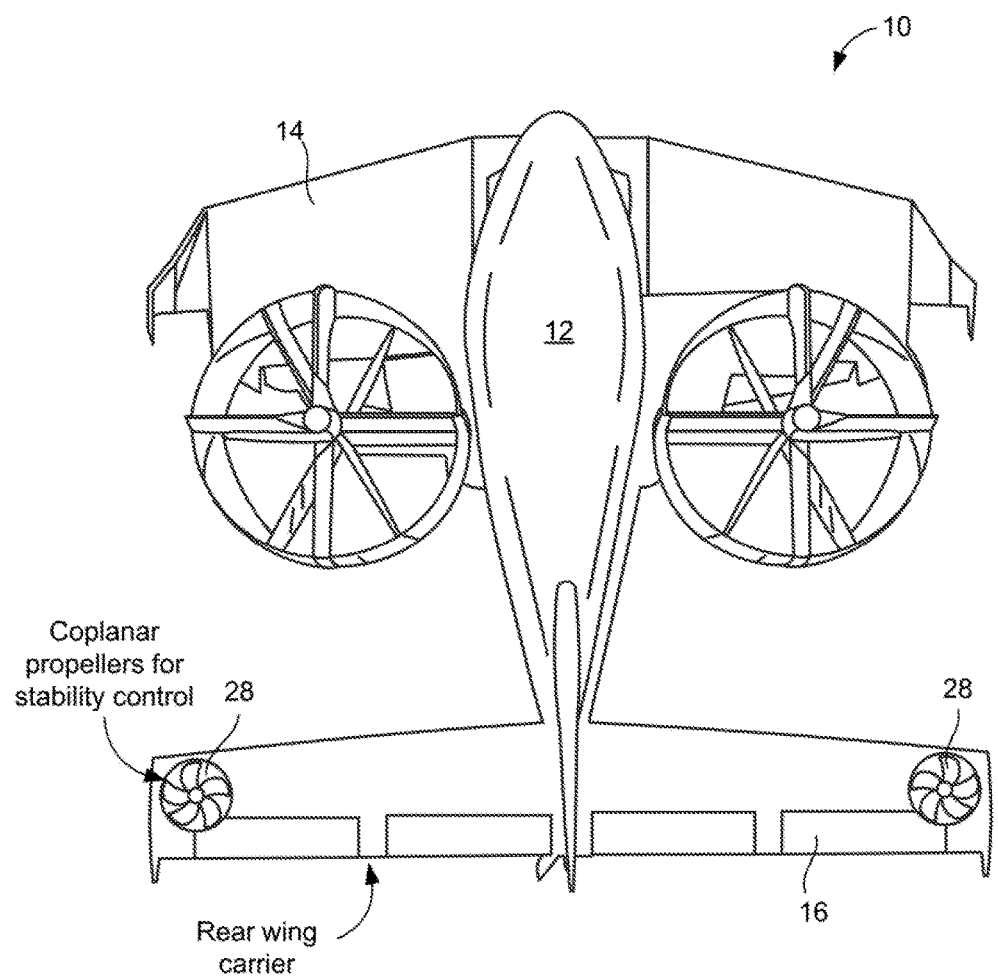
Figure 16:
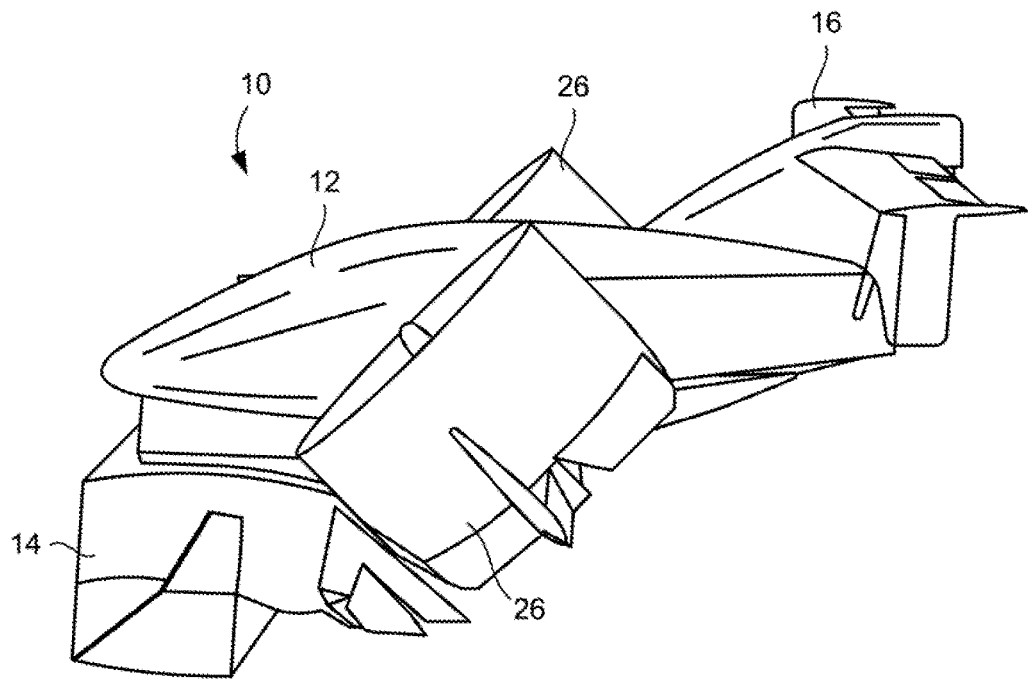
Figure 17:
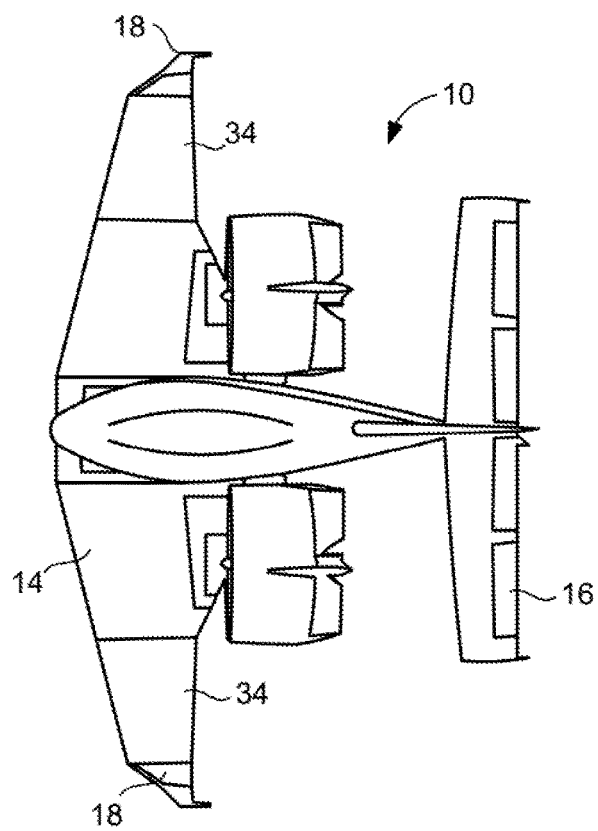
Figure 18:
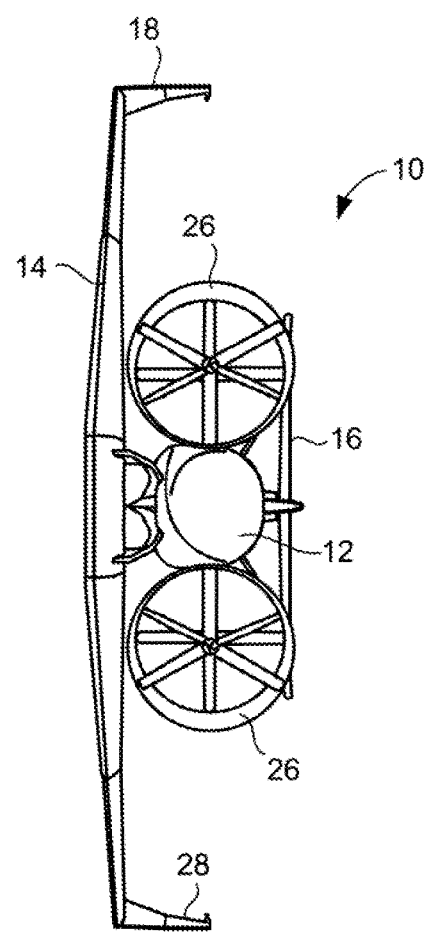

Rear wing carrier 15, which function as tail (See FIG. 12), with a maximum length equal to the minimum length of the forewings, it is equipped with four flaps 24, two operated by the control system set-up and two for the government of the plane 10. In the wing profile 16 are placed two coplanar propellers 28 (See, FIG. 12), with the possibility of the thrust appropriate for the size of the aircraft 10. These have the function of actuators for vehicle stability in pitch and roll. They are controlled by the control system set up. The stability propellers 28 are rotated by electric motors and are equipped with a system which changes by electromechanical actuators the direction of push through the inversion of the propeller in hundredths of the second. The maintenance of the position established by the pilot (hovering) is ensured by the management structure computed by the control of the deflecting fins 29 placed in the flow of ducted propellers 26 at the end of intubation 27 of the same and possibly also alternatively or jointly through the control of the pitch of propellers 26 right or left as a function alternative to the cyclic system used on helicopters. (FIG. 12 view of rear wing, asset control thrusters, 4 flaps of control and government);

A fuselage 12 with the rapport between the width and length of about 1:4.5, while the ratio between the width and height may be about 1:1.5. (See, FIG. 16, FIG. 17, FIG. 18 fuselage 12 in plan and side views, top view of the fuselage 12, organs of sustenance in the transaction side view, aircraft in horizontal asset top view, aircraft in horizontal asset front view).

Figure 19:
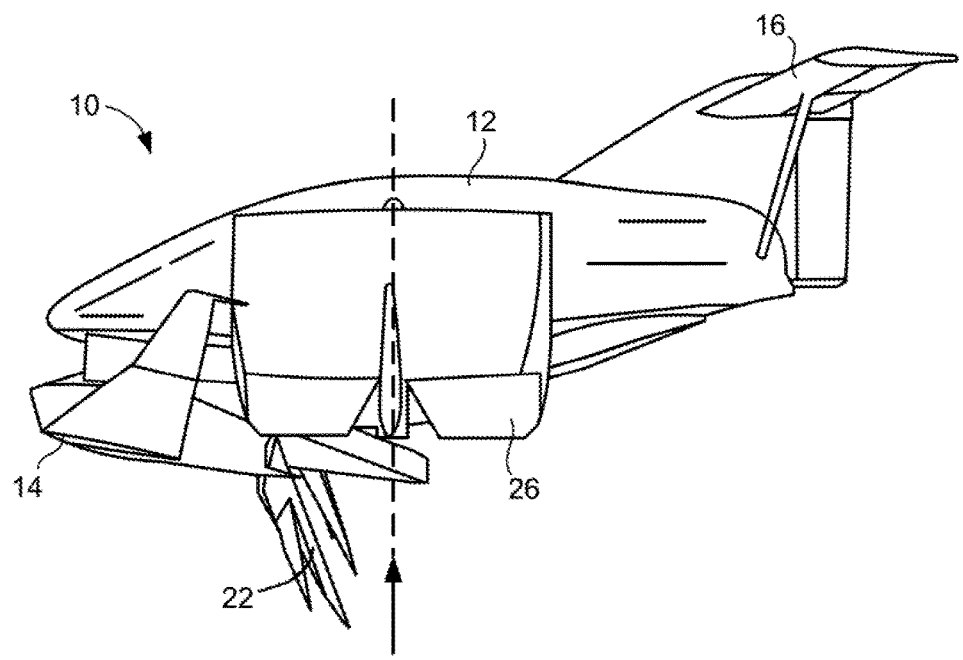
Figure 20:
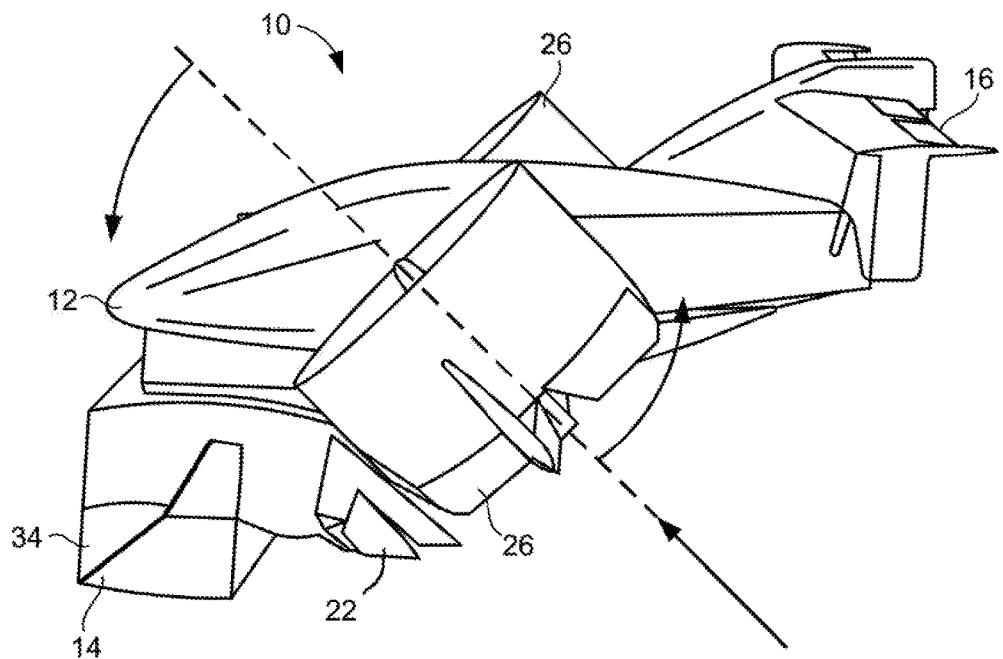

Two counter-rotating ducted propellers 26 on the sides of the fuselage 12 (see, FIG. 12) with the possibility to rotate approximately 100° (normally 90°) from vertical to horizontal position with the propeller thrust axis in the direction of the fore-aft the fuselage 12, which coincides with the axis on which it is placed the result of the global resistance of the plane, in order to prevent torques of inversion not optimal for the asset of the vehicle 10. The propellers 26 are supported by a structure consisting of a tubular element 32, of appropriate size, connected transversely to the axis of the fore-aft the fuselage 12 and to the support structure of the engine inside the fuselage itself. Inside the tubular element is placed a support shaft 30 of the motor movement of engines to the counter-rotating propellers 26 through the application of reverse conic gears. (See Sheet FIG. 19, FIG. 20 rotation ducted counter-rotating propellers 26, propellers in position for vertical asset, propellers in rotation for variation of flying asset).

Figure 21:
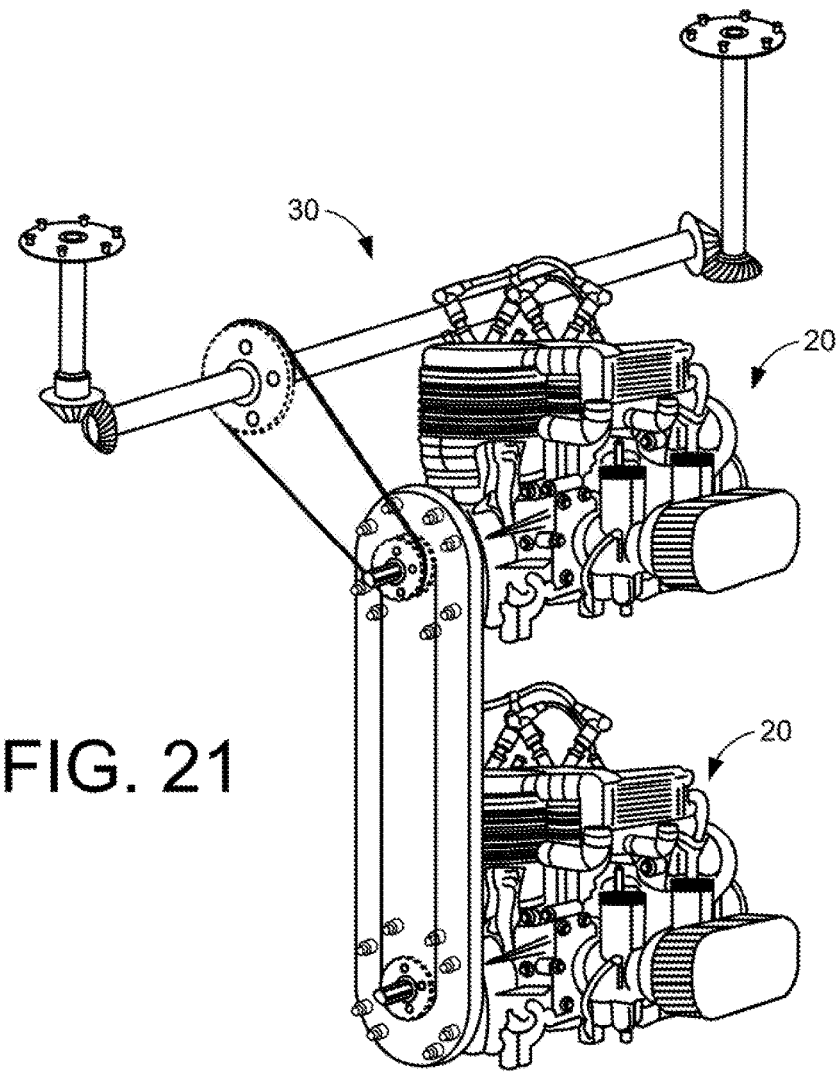

The Intubations 27 of each propeller supports four flaps 22 that are orthogonal to each other (See FIG. 19, FIG. 20, FIG. 7, FIG. 8) to deflect the air flow of the propellers for airplane control in vertical flight and low speed disposition. In particular, the flight control system varies the use of these different systems in the two dispositions to fly. When the propellers 26 are in vertical thrust at low speeds, the flaps 22 of the propellers are the only ones to control the aircraft flight allowing the movement forward, backward, sideways at any angle with respect to bow and turn around its vertical axis on itself in one way or another. During horizontal flight disposition of the flaps propellers assist the ailerons of the wings moving like them allowing the turns to the right and left, the pull-up and beaten, and assist the vertical tail flaps in the disposition of the plane with crosswind. The aircraft has two engines coupled overlapping and independent of each other for a maximum power varying from 200 hp to 300 hp, of ultralight aircraft, higher power on aircraft certified. (See FIG. 21 matching engine and transmission system)

The engines (not shown) are placed behind the cockpit very close to the center of gravity of the airplane inside the fuselage 12. The engines are connected by special free wheels to absorb variations in speed between the same two engines and two propellers are connected through a transmission system using mixture of crowns and chains and drive shafts and bevel gears, which allow the opposed propeller rotation to cancel the torques of the moments of inertia of the tilting moments. The convertiplane 10 can also be driven by electric motors placed in coaxially inside the tubular support of the propellers 26. The efficiency of electric motors similar to those endothermic (less power more torque) will be powered by a power generator capable of supplying power to a battery with sufficient autonomy to a quick landing. The generator and battery not shown are placed behind the cockpit inside the fuselage 12 in the place provided for combustion engines mentioned. The hubs of the propellers are fitted with a system of pitch change propellers with appropriate diameter variable in function of the weights are intubated with four ailerons management of air flow connected to intubation. The maximum thrust will vary in function of the takeoff weight of the medium with the two propellers with at least three variable pitch blades.

Figure 22:
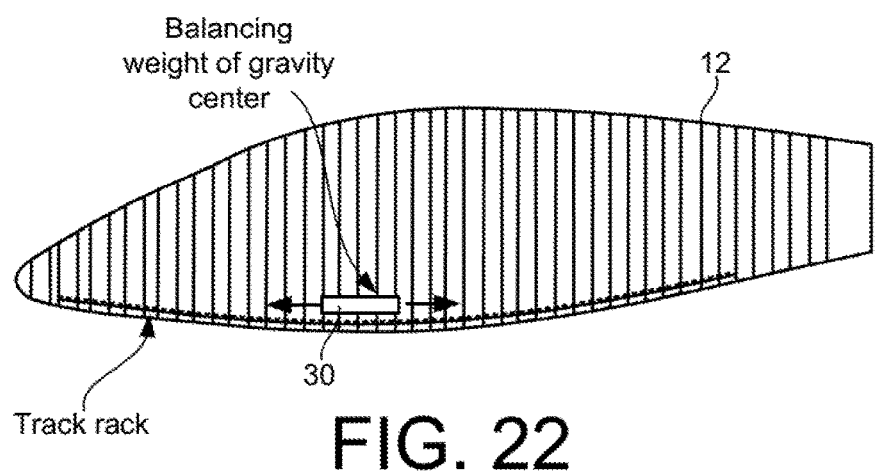

System static balancing center of gravity of the vehicle consists of a weight 30 placed in the lowest part of the fuselage 12, moving longitudinally on to the fuselage itself on a track rack (FIG. 22), so as to balance the disposition of weights at the time of take-off, in vertical orientation, and then to set of weights of the convertiplane when it is moving in the horizontal disposition placing the barycenter of the vehicle in the best position for this kind of flight, putting this one on the wings pushing center. (See FIG. 22 System barycentric weight management, weight movable, guide rails).

Operational characteristics:

140/250 knots cruising speed, max speed over 300 knots, autonomy about 3 h to 850 km, Tangent about 5.000 meters variable depending on the engines power and other vital support for the passengers.

Ability to takeoff and landing, both in vertical in spaces of 5×5 m, with the possibility of fully automatic mode, both in conventional as normal airplane on the airfield runways.

Management systems of automatic digital flight controls:
The convertiplane has the following sensors:
At least three gyroscopes to control the three axes as a function of stability in any condition of takeoff or landing.
Pitometer to measure the speed of the plane in relation to the air, GPS with other functions, the speed over the ground to the altitude than at sea level and above ground, to the location coordinates to the navigation system, also with reference to territorial maps of road and land navigation specific height maps of the soil, for greater safety in air navigation.
Aircraft Altimeter;
Sensors of proximity for vertical takeoff and landing.
Stretch sensor of wing area able for calculating the wing lift to manage the transition from vertical flight to horizontal flight.
5 cameras for multilateral view around the plane to help the driving during flight without pilot using radio remote control, especially during takeoff and landing.
An instrument that indicates the disposition of the plane respects the horizon.
Degrees sensor of incidence for wings stretch sensors of the wing structures for the calculation of lift and the management of the transition from the horizontal disposition to the vertical and vice versa, and to manage the size of the wing in flight depending on the resistance of the plane at high speed HW system for processing flight data:
There are three computers connected. The first direct management of the plane, the second support in the event of failure of the first one, the third for management and control of the first two pc.

Computers in consideration of the parameters detected by the sensors check:
The stability of the vehicle through the management of the weight for center of gravity control in the two flight static disposition, management of the propellers placed in the rear tail for the control of the dynamic roll and pitch of the plane, through the management of the auxiliary flaps on the wings of the vehicle during the horizontal flight.
The transition from vertical to horizontal flight, maintaining the correct flight parameters during the passage of disposition according to requirements of the pilot and the position of the vehicle, the speed of assets transfer in function of environmental parameters and of the potential of the plane, considering the component of wings lift and motors lift and the mutation of the positions of this two elements.
Engine power control applications as required from the flight disposition.
Hydraulic controls for the automatic variation in the incidence of the wings and flaps for maximum lift and minimum drag in the change of disposition from vertical to horizontal flight and the maximum speed, the wings can vary the effect on the horizontal plane fly from 2° to 13°. The incidence of anterior flaps on the wings can vary from 0° to 60° in relation to the chord of the profile. The highest incidence of front wing flaps occurs during the flight in order not influence the vertical thrust of the propellers positioned horizontally, as the propellers varies from horizontal to vertical position; the flaps go to 0° incidence.

Commands, with electromechanical actuators, for the differentiated management of the various flaps in the different systems for flight disposition control.

Automatic control of hydraulic extraction and retraction of the additional wings according to plane speed.

Control of the hydraulic system for propellers axis rotation of 100° considering the disposition and the speed of the plane.

The electrical automatic control of the pitch propellers for maximum performance in the various disposition of the plane.

Management of the rear tail propellers for vehicle dynamics control in vertical disposition flight.

Management of a weight, at the bottom of the fuselage, allowing moving, on the apposite rail, to have the optimal center of gravity of plane in different disposition.

The propellers on the rear tail are operated by electric motors that rotate at constant speed, the most important characteristic is that they usually turn to step zero and the pitch varies continuously to manage the plane disposition and stability, in particular in vertical flight. The management of the pitch is carried out by electronic actuators with response in hundredth of second operated by the disposition control of computer system.

Instrumental equipment on board:

Airspeed indicator, altimeter, vehicle disposition control, navigation center, intelligent autopilot, a radio control of flying, a monitor of sufficient size in order to use some cameras for the 360° horizontally and vertically around the plane for external vision even at night with infrared, support take-off and landing. Instruments complete engines. Navigation system for unmanned flight with remote control or automatic flight on desired course with automatic return and landing. Aircraft base will always be present the computer for control of the assets.

Optional: Radar, parachute at rapid dynamic expulsion, control of the front obstacles with laser brush.

Some possible uses of plane:

Regional Monitoring, also without Pilot;

Quick Movement of the Persons From the areas with limited take-off zone.

Civil Protection And Rescue Without Pilot;

Police And Military Operations In Any Kind Of Situations At Low Altitude, Including Insurgency, With Light Artillery Equipment;

Used to move anonymously, safe point to point.

The invention claimed is:

1. An aircraft comprising:
a fuselage;
a pair of wings surfaces supported by said fuselage one in front of said fuselage and one in back of said fuselage;
a pair of engines connected to each other in tandem, said pair of engines positioned in said fuselage located behind a pilot of the aircraft;
a pair of counter-rotating ducted propellers having a variable pitch, said pair of counter-rotating ducted propellers positioned at respective sides of said fuselage, said pair of counter-rotating ducted propellers having a backbone positioned on a vertical plane passing through a center-of-gravity of the aircraft, the wing surface at the back of the fuselage containing at ends of a respective pair of small propellers having a reversible pitch;
a weight positioned at a lower part of said fuselage, said weight is longitudinally self-propelled;
a digital control system cooperative with three computers, said digital control system receiving data from sensors, said digital control system cooperative with a GPS, said fuselage having a vertical fuselage section and a horizontal fuselage section that have a 1:4.5 ratio of height and length, an aluminum tubular is positioned on an axis of aerodynamic lift of the wing;
a tubular support integral with the wing surface at the front of said fuselage, said tubular support causes the wing surface at the front of the fuselage to rotate to change an incidence of the wing surface, the wing surface at the front of the fuselage rotatable by 14 degrees about a longitudinal axis parallel to a plane of horizontal flight of the aircraft, the wing surface at the front of said fuselage having ends that are retractable centrally, said tubular support is connected to a central structural element, the wing surface at the front of said fuselage having a space, said space receiving the ends when the ends are retracted, the wing surface at the front of the fuselage defining a pair of half wings, said pair of half wings is retractable by a hydraulic or electromechanical system that is controlled by said digital control system, said pair of half wings having a winglet at the end of said pair of half wings, the wing surface at the back of said fuselage supported by an empennage, the wing surface at the back of said support fuselage fixed at an incline of approximately 3 degrees to a direction of running, the pair of small propellers positioned respectively at the ends of the wing surface at the back of said fuselage, the pair of small propellers each independently creating rotation torque to counter rolling motion and pitching during flight of the aircraft, said pair of small motors driven respectively by electric motors and pitch-controlled by electromechanical actuators, said pair of counter-rotating ducted propellers rotatable between −2 degrees and +100 degrees on said supporting axis relative to the plane of horizontal flight of the aircraft, the wing surface at the front of said fuselage and the pair of counter-rotating ducted propellers rotatable independent of each other, each of said pair of half-wings having a pair of front spoilers and a pair of rear spoilers, said weight slidably positioned on a rail to control the center-of-gravity of the aircraft, said digital control system cooperative with said weight to move said weight longitudinally on said rail.

2. The aircraft of claim 1, said pair of counter-rotating ducted propellers supported by a tubular positioned on said fuselage vertical to a longitudinal axis of the center-of-gravity of the aircraft, said tubular fixed to said fuselage, four ailerons positioned at orthogonal axes of said tubular.

3. The aircraft of claim 1, said digital control system linked to accelerometer sensors and gyroscopic sensors, said digital control system measuring an attitude of the aircraft and a bearing capacity of the aircraft to determine a position of said weight relative to the center-of-gravity of the aircraft and a thrust of said pair of small propellers.

4. The aircraft of claim 1, further comprising:
a pair of motors positioned interior of said fuselage, said pair of motors stacked in tandem and connected to a transmission system, said transmission system having a transmission axis parallel to shafts of said pair of motors.

5. The aircraft of claim 1, the wing surface at the front of said fuselage comprising a pair of front wings, said pair of front wings retractable for up to 50% of a length of said pair of front wings.

6. The aircraft of claim 1, further comprising:
a camera connected to said GPS to automatically determine a landing point of the aircraft.

7. The aircraft of claim 1, further comprising:
a wireless steering system cooperative with said digital control system to allow the aircraft remote control.

8. The aircraft of claim 1, further comprising:
three electronic gyros control three axes of the aircraft, said three electronic gyros is connected to said digital control system, said three computers operating separately in cascade, a first computer of said three computers controlling operation of the aircraft, said second computer of said three computers repeating simultaneously the operation of the aircraft, a third computer of said three computers repeating simultaneously the operations of the aircraft and checking for discrepancies.

* * * * *